United States Patent [19]
Hohnl

[11] Patent Number: 6,041,584
[45] Date of Patent: Mar. 28, 2000

[54] ADJUSTABLE GAUGE WHEEL SUPPORT STRUCTURE

[75] Inventor: Gary David Hohnl, Slinger, Wis.

[73] Assignee: Deere & Company, Moline, Ill.

[21] Appl. No.: 09/069,134

[22] Filed: Apr. 29, 1998

[51] Int. Cl.[7] .................................................. A01D 53/08
[52] U.S. Cl. ............................................. 56/17.2; 280/43
[58] Field of Search .................................... 56/16.7, 17.2, 56/1, DIG. 3, DIG. 10, DIG. 9, DIG. 22, DIG. 18, 15.6, 15.8, 15.2; 280/43, 43.14, 43.13, 43.17

[56] References Cited

U.S. PATENT DOCUMENTS

| | | | |
|---|---|---|---|
| 2,915,318 | 12/1959 | Chesser ................................. | 280/43 |
| 3,043,604 | 7/1962 | Rehnberg et al. ..................... | 280/43 |
| 3,210,089 | 10/1965 | Hoffman et al. ...................... | 280/43 |
| 3,755,998 | 9/1973 | Hoffmeyer ......................... | 280/43 X |
| 4,172,351 | 10/1979 | Scanland ............................ | 56/320.1 |
| 4,224,785 | 9/1980 | Hoch .................................... | 56/17.4 |
| 4,248,034 | 2/1981 | Jackson et al. ..................... | 56/17.2 |
| 4,280,319 | 7/1981 | Scanland ............................ | 56/255 |
| 4,321,784 | 3/1982 | Wood et al. ........................ | 56/17.2 |
| 4,321,785 | 3/1982 | Kaland ............................... | 56/17.2 |
| 4,735,037 | 4/1988 | Benter ................................ | 56/13.3 |
| 4,840,020 | 6/1989 | Oka .................................... | 56/15.2 |
| 5,136,829 | 8/1992 | Sebben et al. ..................... | 56/17.2 |
| 5,528,886 | 6/1996 | Esau ................................. | 56/15.6 X |
| 5,560,629 | 10/1996 | Allard et al. ......................... | 280/43 |

OTHER PUBLICATIONS

Deere & Company, Parts Catalog 2317, pp. 85–22, 85–16 and 85–4, publication date—Apr. 16, 1996, published in the U.S.A.

Deere & Company, Sabre Lawn Tractor Operators Manual, cover page, p. 32 and p. 48, publication date—Oct. 1, 1996, published in the U.S.A.

*Primary Examiner*—Robert E Pezzuto

[57] ABSTRACT

An adjustable gauge wheel support structure is provided for selectively adjusting the height of cut of a mower deck. The structure includes a gauge wheel carried on a U-shaped arm which is pivotally attached to a deck bracket. A spring loaded J-pin locking mechanism is provided to secure the arm in a plurality of positions relative to the bracket. The wheel is supported on one of the parallel legs of the U-shaped arm and twisting forces encountered by the wheel and its supporting leg are resisted through locking the two legs and bracket together with the J-pin. No tools are required to adjust the wheel height and no parts have to be removed or loosened to make the adjustments, thereby minimizing the likelihood that parts will be lost or misplaced.

6 Claims, 3 Drawing Sheets

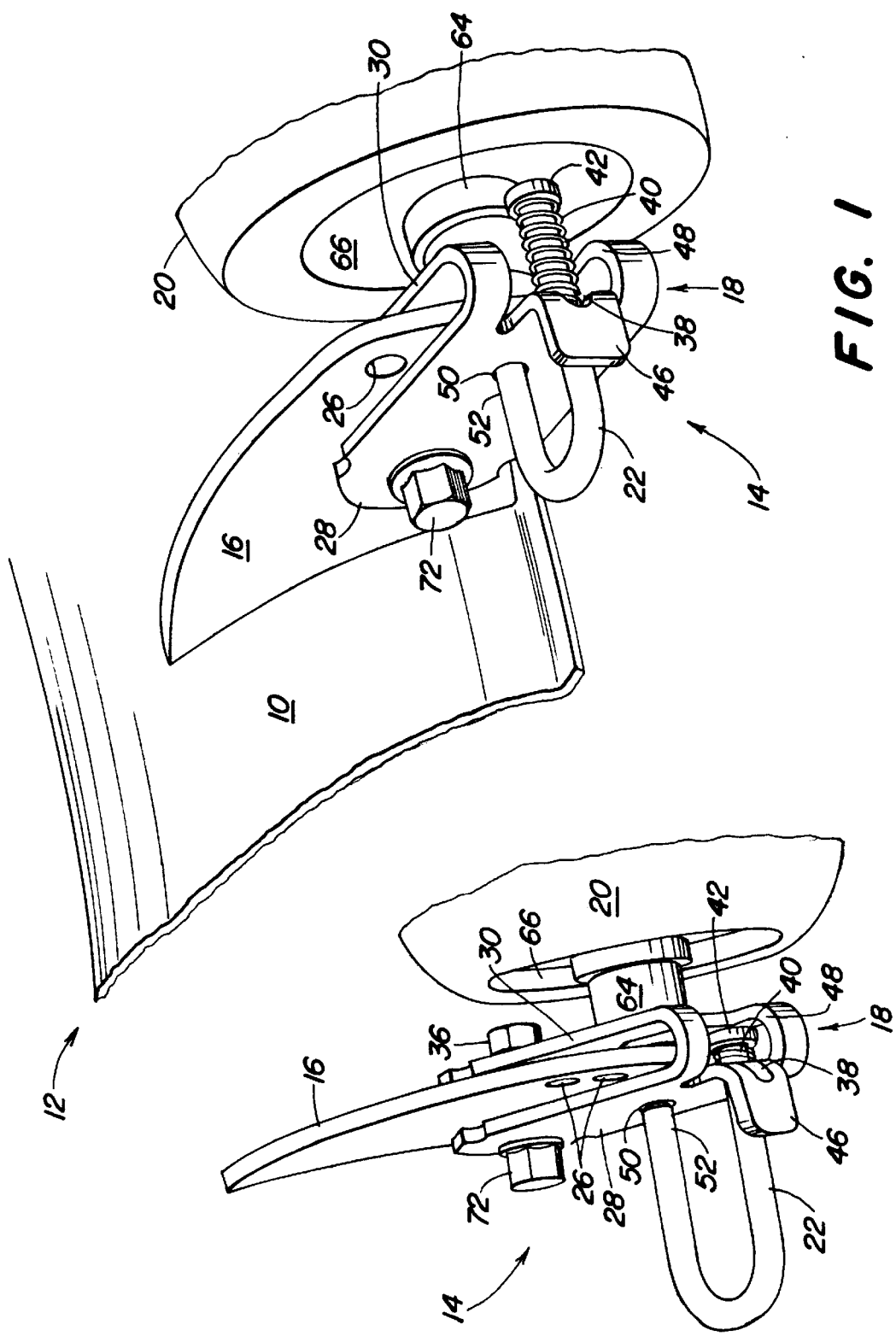

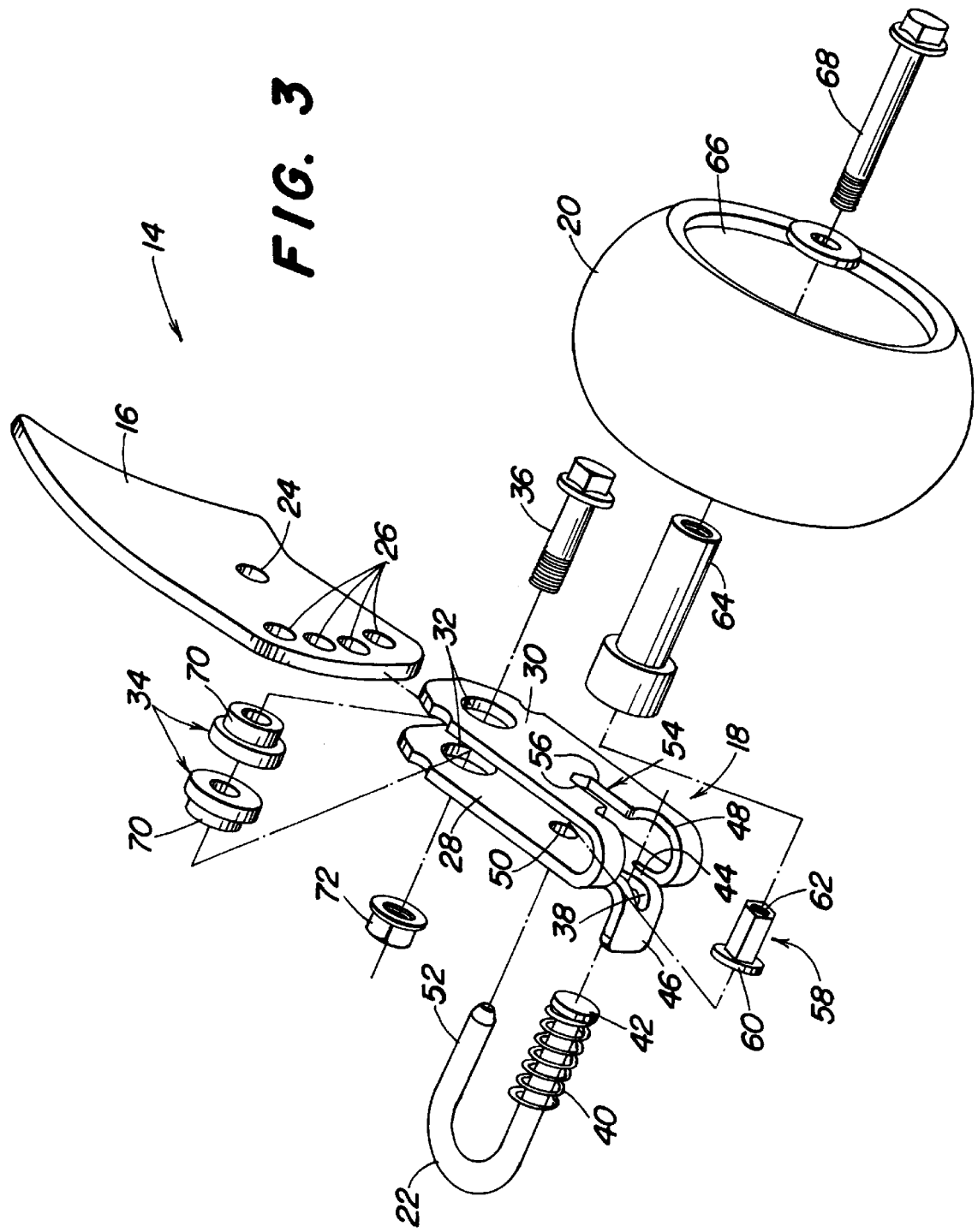

ADJUSTABLE GAUGE WHEEL SUPPORT STRUCTURE

FIELD OF THE INVENTION

The present invention relates to mower decks and more specifically to a gauge wheel support structure for selectively adjusting the cutting height of such decks.

BACKGROUND OF THE INVENTION

Mower decks used in cutting grass and similar vegetation typically are provided with one or more gauge wheels which support them at a predetermined space above the ground and serve to prevent scalping or control the height of cut. The wheel supports often include a bracket attached to the skirt of a deck, an arm pivotally mounted on the bracket, a wheel carried on the arm and means for vertically adjusting the arm with respect to the bracket.

Frequently the brackets are generally flat plates which are rigidly attached to the downwardly extending skirt and project outwardly therefrom. The arms are commonly elongated straps which are then supported on a bracket pivot structure for swinging movement adjacent to and parallel with the bracket. At the free end of the arm is carried the gauge wheel. Various types of structures have then been used to secure the arm with the bracket in a plurality of vertical positions to provide a plurality of height of cut settings.

When gauge wheel arms are supported in this manner, the arm and its pivotal mounting to the bracket can be subjected to twisting forces since the arm and wheel are supported in a cantilevered fashion from one side of the bracket.

SUMMARY OF THE INVENTION

It would therefore be desirable to provide a gauge wheel support structure wherein the twisting forces encountered by the pivotal mounting for the gauge wheel arm are minimized.

Towards this end, there is provided a U-shaped gauge wheel support arm having two legs, one of which is pivotally mounted to each side of a generally flat deck bracket. Twin bushings provide additional support for the two legs on the opposite sides of the bracket. The legs of the support arm are mounted closely adjacent to the bracket to restrict their sideways movement if twisting is encountered. The wheel is rotatably carried on a bushing mounted in one leg of the arm and supported by both legs of the arm as well as the bracket to further resist twisting. One end of a spring loaded J-pin passes through openings in one arm, the bracket and into an opening of the bushing which carries the wheel. To secure the arm with the deck bracket in a plurality of vertical positions, the J-pin is mounted at one end of the arm so that it can be removably inserted through one of a plurality of openings provided in the bracket and in each leg. To hold the J-pin in the selected adjustment, a spring is provided.

With the present invention, an adjustable gauge wheel support is provided that resists twisting forces encountered by the pivotable support for the arm, irrespective of which vertical height of cut setting is selected. Further, the J-pin locking arrangement serves not only to releasably adjust the height of cut, but also to support the wheel on the two legs of the arm and the bracket. The spring loaded J-pin allows the arm to be easily adjusted without tools and serves to retain the arm in its selected setting. With the present design, no parts need to be loosened or removed to adjust the gauge wheel height, thereby minimizing the likelihood that parts will be lost or misplaced.

BRIEF DESCRIPTION OF THE DRAWINGS

FIG. 1 illustrates an elevated front perspective view of the adjustable gauge wheel structure subject of the present invention, with the locking J-pin engaged.

FIG. 2 illustrates an elevated front perspective view of the adjustment structure of FIG. 1 with the J-pin disengaged.

FIG. 3 illustrates an exploded perspective view of the adjustment structure.

DESCRIPTION OF THE PREFERRED EMBODIMENT

Figure 5:
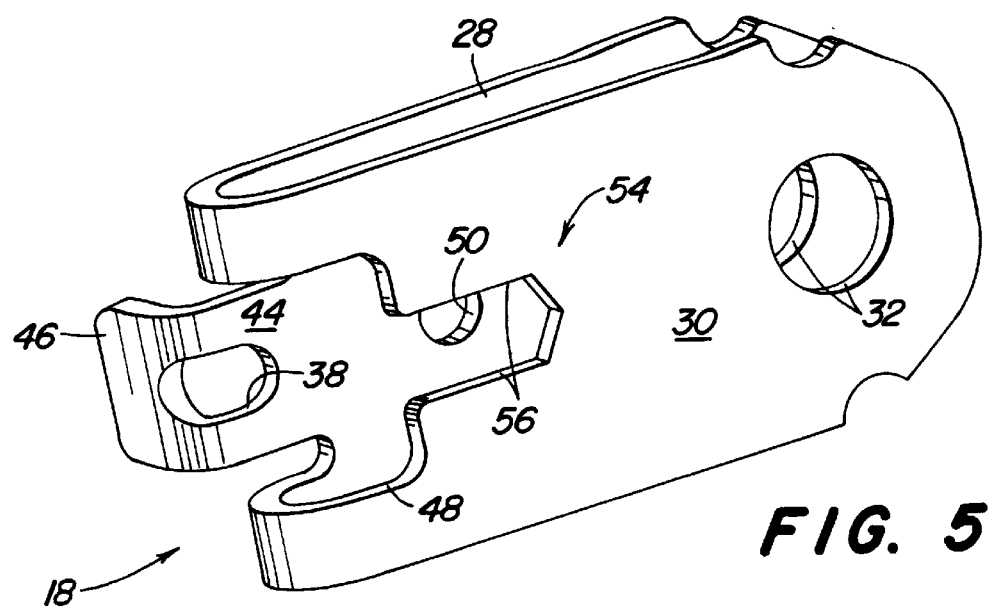
FIG. 5 illustrates an enlarged perspective view of the U-shaped wheel support arm.

Looking first to FIGS. 1 and 2, there is illustrated a portion of a downwardly extending skirt 10 of a mower deck 12 and an adjustable gauge wheel support structure 14 mounted thereon. While only a single wheel support structure 14 is illustrated, it is to be understood that more than one such structure could be used with a mower deck.

The structure 14 includes a bracket 16 in the form of an upstanding plate rigidly attached to the skirt 10 and extending essentially horizontally therefrom. Pivotally supported on the bracket 16 is a U-shaped arm 18 which in turn carries a gauge wheel 20. A locking means in the form of a spring loaded J-pin 22 secures the arm 18 and the bracket 16 together for supporting the wheel 20.

Looking as well to FIG. 3, which shows an exploded view of the components of the gauge wheel support structure 14, it can be seen that the bracket 16 includes a pivot opening 24 to support the arm 18. Further provided in the bracket 16 are a series of first seats or openings 26 arranged generally in an arc and vertically spaced from one another. The U-shaped arm 18 includes a pair of legs 28 and 30 which are generally parallel and have pivot openings 32 in their adjacent end portions. Essentially identical bushings 34 are received in the pivot openings 32 for supporting a bolt 36 and permitting swinging motion of the arm 18 about the bracket 16.

Looking now to FIG. 3 and the enlarged view of the arm 18 found in FIG. 5, it can be seen that the J-pin 22 is received for slideable back and forth movement through the guide surface 38. A compression spring 40 is mounted on the J-pin 22, and engages at its one end the flat abutment surface 42 of the J-pin 22. At its other end, the spring 40 abuts a stop 44 provided on a turned out tab 46 formed in the arm 18. A ledge 48 formed in the end of the arm 18 serves as a sliding surface for the biasing means or spring 40. A second seat or opening 50 is provided in one leg 28 of the arm 18 to receive the locking end 52 of the J-pin 22 and allow it to come into registry with one of the first openings 26 in the bracket 16.

Figure 4:
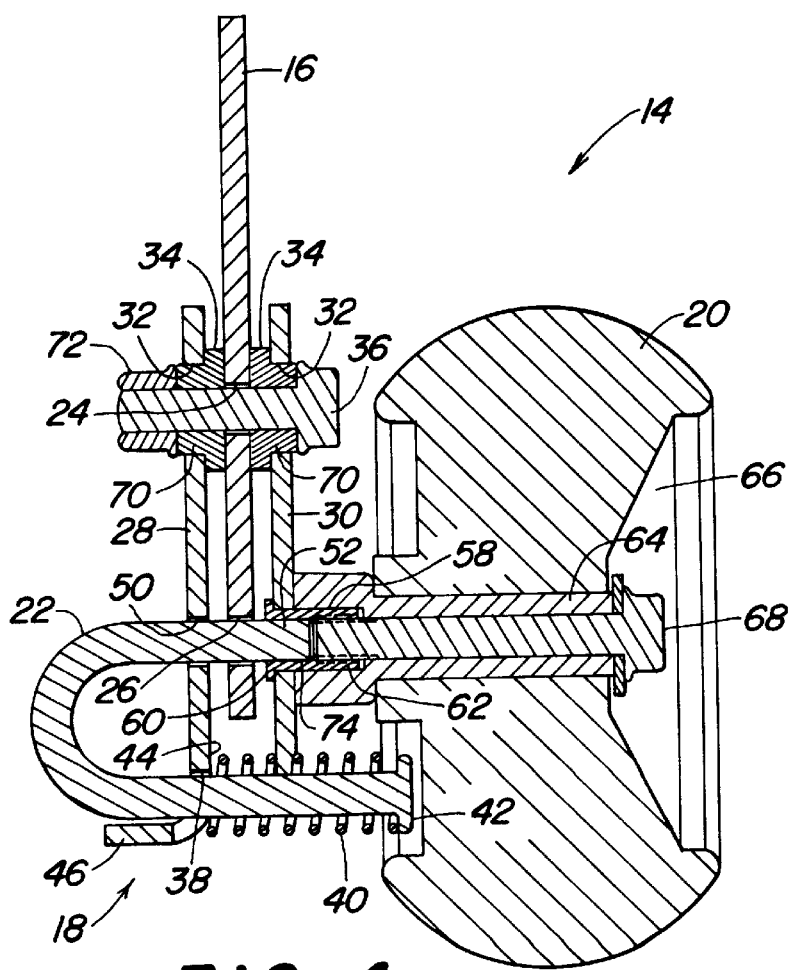
FIG. 4 illustrates a sectional view through the center of the adjustment structure.

Looking again to FIGS. 3 and 5, it will be seen that one leg 30 of the arm 18 includes a mounting slot 54 having flat upper and lower sides 56. Into this slot 54 is placed the hexagonal shoulder nut 58. Nut 58 has a flat head 60 at one end and carries internal threads 62 in its other end. When received in the slot 54, the flat sides 56 serve to constrain the shoulder nut 58 against rotation. The wheel bushing 64, see FIG. 4, is received in the hub 66 of the wheel 20 and is secured to the shoulder nut 58 by the threaded flange bolt 68. In this manner the wheel 20 is securely mounted to the leg 30 of the arm 18 for movement with the arm 18 as it is adjusted relative to the bracket 16.

Looking again to FIG. 4 which shows a cross-sectional view of the assembled gauge wheel support structure 14, it will be seen that the pivot support for the arm 18 is provided by the flange bolt 36 and bushings 34. Each bushing 34 includes a reduced portion 70 sized to fit in the openings 32 of the legs 28-30 of the arm 18. A nut 72 serves to tighten the flange bolt 36 and provide a swinging pivot structure for the arm 18 on the bracket 16.

In operation, the gauge wheel 20 can be adjusted to one of a plurality of positions to vary the height or spacing of the mower deck 12 from the ground and thereby the length of cut realized with the mower deck 12. As shown in FIGS. 1 and 4, the J-pin 22 secures the arm 18 to the bracket 16 and the spring biasing means 40 urges the head 42 of the J-pin 22 away from the stop 44 on the arm 18 to maintain the short end 52 of the J-pin 18 in the selected seat 26 of the bracket 16. To move the arm 18 relative to the bracket 16 and adjust the height of cut, the J-pin 22 is simply pulled out of the bracket opening 26, to the position illustrated in FIG. 2, thereby permitting the arm 18 to be swingably moved relative to the bracket 16. To facilitate axial sliding movement of the J-pin 22, the tab 46 includes a flat surface which extends generally parallel with the axis of the J-pin movement and closely adjacent to the J-pin 22. When the arm 18 has been pivoted to the new position, the J-pin 22 can be allowed to slide into the selected seat 26 of the bracket 16. Spring pressure acting on the J-pin 22 then urges the J-pin 22 into the desired opening 26 of the bracket 16 to reset the height of the gauge wheel 20 relative to the mower deck 12. When the J-pin 22 is in its engaged position as shown in FIGS. 1 and 4, the end portion 52 of the J-pin 22 passes through the second opening 50 in the leg 28 of the arm 18, through one of the seats or openings 26 in the bracket 16 and is received into the opening 74 in the shoulder nut 58 which supports the wheel 20 on the other leg 30 of the arm 18. In this manner, the J-pin 22 serves to support the wheel 20 on the bracket 16 and opposite leg 28 of the arm 18. Any forces encountered by the wheel 20 can thereby be transferred to both legs 28 and 30 of the arm 18 and the bracket 16.

With the spring loaded biasing means provided on the J-pin and the easily moveable function provided by the J-pin, resetting any height of the mower deck's gauge wheel structure is a simple task requiring no tools and only a short time.

I claim:

1. An adjustable gauge wheel support arm structure usable with a gauge wheel and mower deck having a downwardly extending skirt, said structure including:

a generally flat and vertically extending support bracket attached to the skirt and projecting outwardly therefrom, said bracket including a plurality of vertically spaced first seats horizontally spaced from the deck;

a U-shaped gauge wheel adjustment arm including first and second legs, one leg being carried closely adjacent each vertical side of the bracket;

means swingably mounting the arm on the bracket;

a wheel support carried in one of the first and second legs for rotatably mounting the gauge wheel, said support including an opening therein;

a second seat carried in the other of said first and second legs;

a pin member slideably carried between the legs, one portion of the pin member being slideably receivable in the second seat, one of the first seats in the bracket and the opening in said support to secure the arm and wheel with the bracket, and biasing means acting between the pin member and arm to releasably urge the one portion of the pin member towards engagement with one of the first seats, the second seat and said opening.

2. The invention defined in claim 1 wherein the first seats are a plurality of generally horizontally extending openings passing through the bracket and the second seat is an opening in the other leg of the arm.

3. The invention defined in claim 1 wherein the arm is provided with a guide surface and stop, the pin member includes an abutment surface and the biasing means is a spring adapted to act between the abutment surface and stop to urge the one portion of the pin member towards engagement with the second seat and one of the first seats.

4. The invention defined in claim 1 wherein one leg of the arm includes a slot adapted to slideably receive the wheel support.

5. The invention defined in claim 1 wherein the pin member is a J-pin.

6. The invention defined in claim 1 wherein the means for mounting the arm on the bracket includes openings in the bracket and each leg of the arm, with a bushing being received in the openings of each leg, and a bolt is carried in the bushings and opening of the bracket for swingably mounting the arm on the bracket.

* * * * *